United States Patent [19]

Osawa et al.

[11] Patent Number: 4,930,479
[45] Date of Patent: Jun. 5, 1990

[54] IRREGULAR COMBUSTION DETERMINING DEVICE FOR AN INTERNAL COMBUSTION ENGINE

[75] Inventors: Kouichi Osawa, Susono; Norio Shibata, Toyota; Shinichi Abe, Aichi, all of Japan

[73] Assignee: Toyota Jidosha Kabushiki Kaisha, Aichi, Japan

[21] Appl. No.: 355,173

[22] Filed: May 22, 1989

[30] Foreign Application Priority Data

May 24, 1988 [JP] Japan ................................. 63-126757
Jul. 22, 1988 [JP] Japan ................................. 63-183859
Apr. 28, 1989 [JP] Japan ................................. 1-107801

[51] Int. Cl.$^5$ ............................................. F02D 41/14
[52] U.S. Cl. .................................... 123/436; 123/435
[58] Field of Search ............... 123/436, 419, 440, 478, 123/480, 486, 425, 435

[56] References Cited

U.S. PATENT DOCUMENTS

| 4,809,664 | 3/1989 | Nakamoto et al. | 123/436 |
| 4,821,698 | 4/1989 | Atago et al. | 123/436 |
| 4,829,963 | 5/1988 | Oblaender et al. | 123/436 |

FOREIGN PATENT DOCUMENTS 61-258955 11/1986 Japan ................................. 123/436

Primary Examiner—Raymond A. Nelli
Attorney, Agent, or Firm—Kenyon & Kenyon

[57] ABSTRACT

An irregular combustion determining device comprising a variation detecting unit, a first determining unit, and a second determining unit. The variation detecting unit detects a variation in an engine speed on the basis of two successive engine speed detected at predetermined crank angles. The first determining unit determines that an irregular combustion has occurred when the variation in the engine speed detected by the variation detecting unit is larger than a predetermined first variation in the engine speed. When the first determining unit determines that an irregular combustion has occurred, at the next detection of the variation in the engine speed by the variation detecting unit, the second determining unit determines that an irregular combustion has occurred when the variation in the engine speed detected by the variation detecting unit is larger than the predetermined second variation in the engine speed which is smaller than the predetermined first variation in the engine speed.

19 Claims, 17 Drawing Sheets

| Fig.2A |
| Fig.2B |

| Fig.9A |
| Fig.9B |

IRREGULAR COMBUSTION DETERMINING DEVICE FOR AN INTERNAL COMBUSTION ENGINE

BACKGROUND OF THE INVENTION

1. Field of the Invention

The present invention relates to a device for determining an irregular combustion in an internal combustion engine.

2. Description of the Related Art

Japanese Unexamined Patent Publication No. 61-258955, discloses an irregular combustion determining device for an internal combustion engine having a plurality of cylinders. In this device, an engine speed during a combustion process in each cylinder is sequentially detected, and variations in the engine speed at the successive stages of the combustion process in each cylinder are calculated. Note the variation in engine speed is defined as the difference between two successive engine speeds at two successive stages of the combustion process. The variation $\Delta NE$ in the engine speed is calculated from the following equation.

$$\Delta NE = NEB - NE$$

Where
  $NE$: an engine speed in a present stage of the combustion process
  $NEB$: an engine speed in a stage of the combustion process immediately preceding the present stage of the combustion process.

When the variation in the engine speed is larger than a predetermined variation, it is determined that a misfire has occurred.

In this device, however, the following problem arises It is assumed that a malfunction has occurred in one of the fuel injectors of the engine, and that the malfunctioning fuel injector has injected a large amount of fuel into the intake ports, whereby an air-fuel mixture fed into the cylinder corresponding to the malfunctioning fuel infector (hereinafter referred to as a failed cylinder) becomes extremely rich, and thus a misfire occurs in the failed cylinder. In this case, the engine speed NE during the combustion process in the failed cylinder is lowered, and accordingly the variation $\Delta NE$ in the engine speed becomes greater. Therefore, it can be ascertained that a misfire has occurred when it is determined that the variation $\Delta NE$ in the engine speed is greater than a predetermined variation. In this case, an oxygen concentration detection sensor (hereinafter referred to as an $O_2$ sensor) arranged in an exhaust passage of an engine continues to output a rich signal, and accordingly, when an air-fuel ratio feedback control operation is executed, the air-fuel mixture fed into normal-functioning cylinders supplied by normal-functioning injectors (hereinafter referred to as a normal cylinder) becomes extremely lean, and thus an misfire occurs in the normal cylinders. When a misfire occurs in the normal cylinder immediately before the stage of the combustion process in the failed cylinder, the two successive engine speeds in the successive combustion processes in the normal and the failed cylinders are lowered In this case, the variation in the engine speed, which is represented by a difference between an engine speed during the combustion process of the normal cylinder and an engine speed during the combustion process of the failed cylinder, becomes smaller than the predetermined variation, and thus a misfire in the failed cylinder can not be detected.

A similar problem arises, when the malfunctioning fuel injector injects a small amount of fuel into the intake port, i.e., a misfire in the failed cylinder can not be detected.

SUMMARY OF THE INVENTION

An object of the present invention is to provide an irregular combustion determining device capable of accurately determining an irregular combustion.

Therefore, according to the present invention, there is provided an irregular combustion determining device for an internal combustion engine, which device comprises: an engine speed detecting means for detecting an engine speed at a predetermined crank angle; a variation detecting means for successively detecting a variation in an engine speed on the basis of two successive engine speeds detected by the engine speed detecting means; a first determining means for determining that an irregular combustion has occurred when the engine speed variation detected by the variation detecting means is larger than a predetermined first engine speed variation; and a second determining means for determining that, when the first determining means has determined that an irregular combustion has occurred, at a next detection of the engine speed variation by the variation detecting means, an irregular combustion has occurred when the engine speed variation detected by the variation detecting means is larger than a predetermined second engine speed variation which is smaller than the predetermined first engine speed variation.

The present invention may be more fully understood from the description of preferred embodiments of the invention set forth below, together with the accompanying drawings.

BRIEF DESCRIPTION OF THE DRAWINGS

In the drawings:

FIGS. 11, 11a and 11b are flow charts of a third embodiment for executing a diagnosis of a combustion state according to the present invention;

DESCRIPTION OF THE PREFERRED EMBODIMENTS

Figure 1:
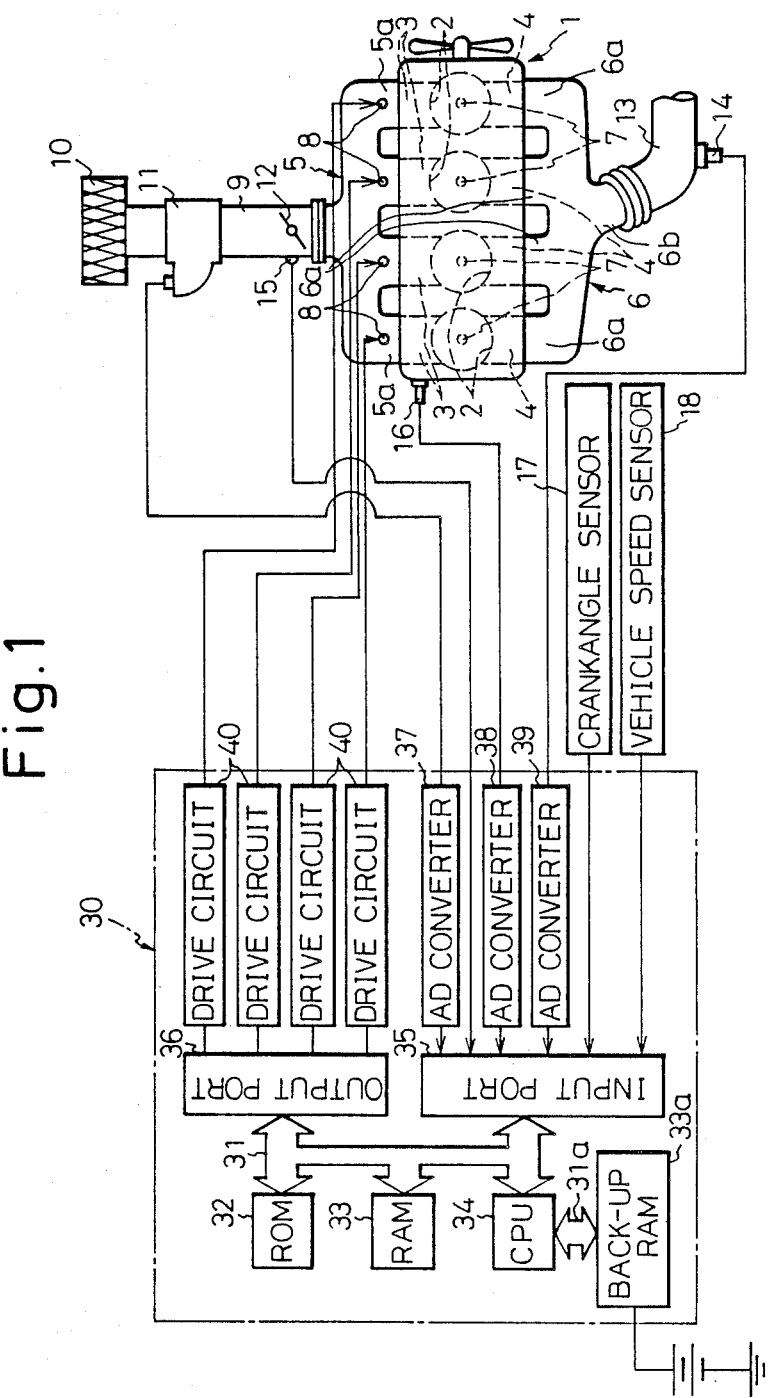
FIG. 1 is a schematic view of a four-cylinder engine.

Referring to FIG. 1, which shows a four-cylinder engine, 1 designates an engine body, 2 a cylinder, 3 an intake port, 4 an exhaust port, 5 an intake manifold, 6 an exhaust manifold, and 7 a spark plug arranged in each cylinder 2. Each intake branch pipe 5a of the intake manifold 5 is connected to each corresponding intake port 3, and fuel injectors 8 for injecting fuel to each intake port 3 are arranged in each intake branch pipe 5a. The intake manifold 5 is connected to an air cleaner 10 via a intake pipe 9 having an air flow meter 11 arranged therein and a throttle valve 12 is arranged in the intake pipe 9 downstream of the air flow meter 11. Each exhaust branch pipe 6a of the exhaust manifold 6 is connected to each corresponding exhaust port 4, and the exhaust manifold 6 is connected to the exhaust pipe 13 at a junction 6b.

The electronic control unit 30 is constructed as a digital computer and comprises a ROM (read only memory) 32, a RAM (random access memory) 33, a CPU (microprocessor, etc.) 34, an input port 35, and an output port 36. The ROM 32, the RAM 33, the CPU 34, the input port 35, and the output port 36 are interconnected via a bidirectional bus 31, and the CPU 34 is also connected to a back up RAM 33a via a bidirectional bus 31a.

The air flow meter 11 is connected to the input port 35 via an AD converter 37, and a throttle switch 15 for detecting an idling degree of opening of the throttle valve 12 is attached to the throttle valve 12, and signals output by the throttle switch 15 are input to the input port 35. A cooling water temperature sensor 16 for detecting a temperature of a cooling water for the engine is arranged in the engine body 1, and is connected to the input port 35 via an AD converter 38, and an $O_2$ sensor 14 is arranged in the exhaust pipe 13, and is connected to the input port 35 via an AD converter 39. A crank angle sensor 17 generates a pulse at predetermined crank angles, and the pulses output by the crank angle sensor 17 are input to the input port 35, and accordingly, an engine speed is calculated on the basis of the pulses output by the crank angle sensor 17. A vehicle speed sensor 18 for detecting a vehicle speed is also connected to the input port 35.

The output port 36 is connected to each fuel injector 8 via corresponding drive circuits 40.

Figures 2, 2A:
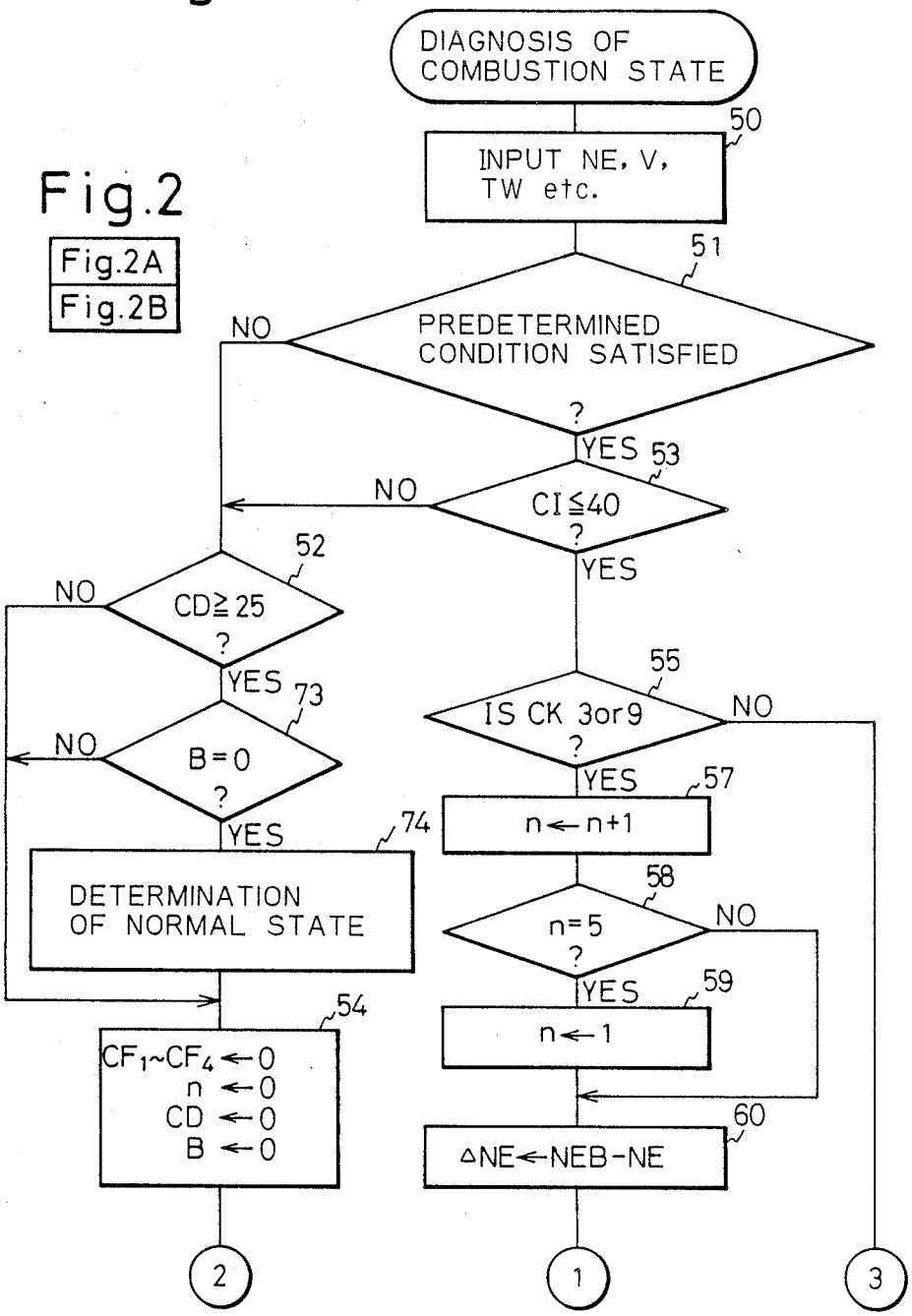
FIGS. 2, 2a and 2b are flow charts of a first embodiment for executing a diagnosis of a combustion state according to the present invention.
Figure 2B:
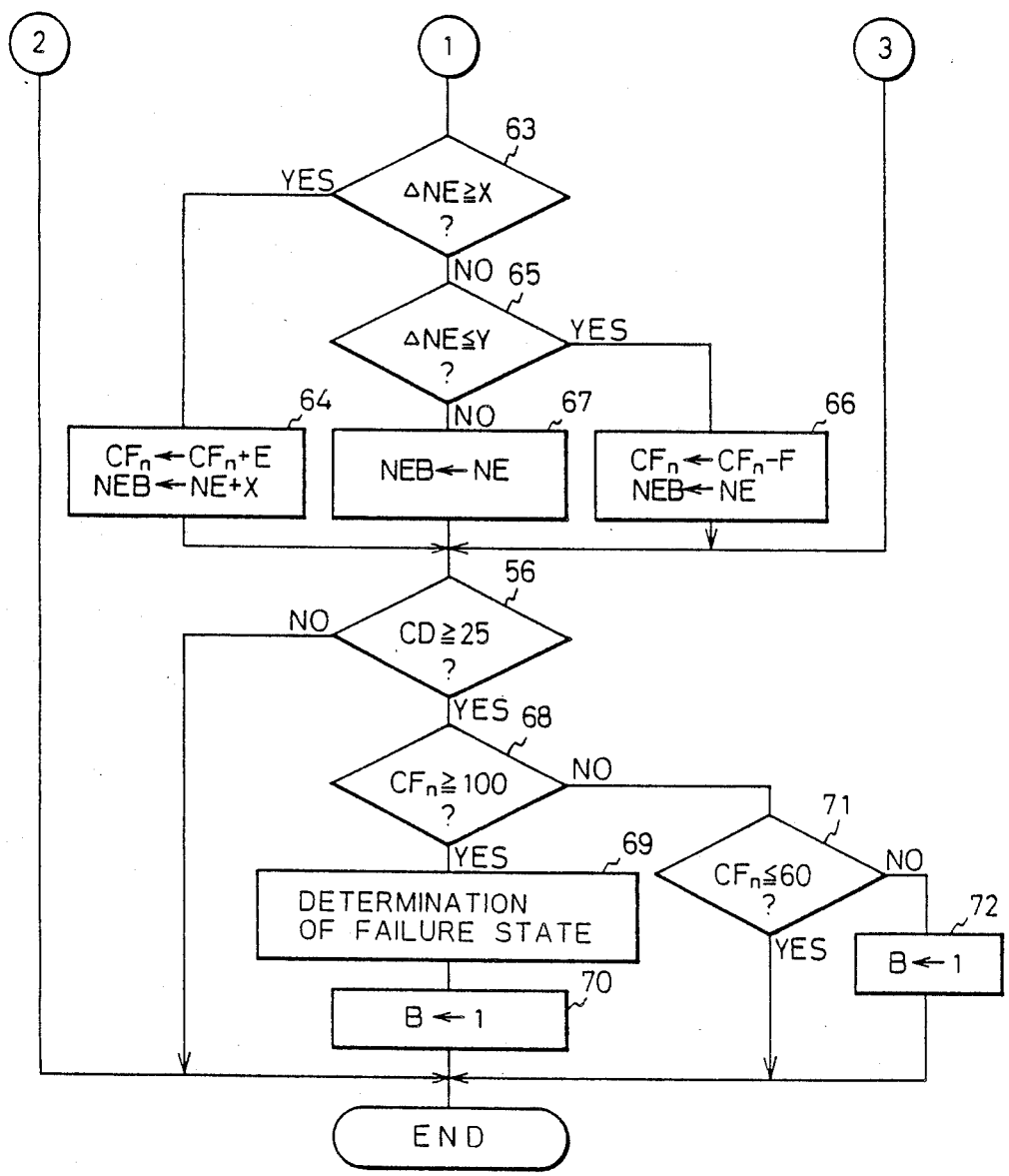

FIG. 2 illustrates a routine for executing a diagnosis of a combustion state in accordance with a first embodiment of the present invention. The routine illustrated in FIG. 2 is processed by sequential interruptions executed at every crank angle (CA) of 30°.

Referring to FIG. 2, at step 50, an engine speed NE detected by the crank angle sensor 17, a vehicle speed V detected by the vehicle speed sensor 18, and a temperature TW of the engine cooling water detected by the cooling water temperature sensor 16, and the like are input to the CPU 34, and at step 51, it is determined whether or not an engine operating state satisfies a predetermined condition. It is considered that the engine operating state does not satisfy the predetermined condition when, for example, 120 seconds has not passed from the time at which the engine was started; the engine speed is higher than 1000 rpm; the vehicle speed is higher than 2.8 km/h; an air-fuel ratio feedback control has not been executed; or at least one sensor is not functioning in a normal manner. When the engine operating state does not satisfy the predetermined condition, the routine goes to step 52. Conversely, when the engine operating state satisfies the predetermined condition, the routine goes to step 53, and it is determined whether or not an idle time count value CI, which represents a time elapsed since an idle running of the engine was stated, is equal to or smaller than 40.

Figure 3:
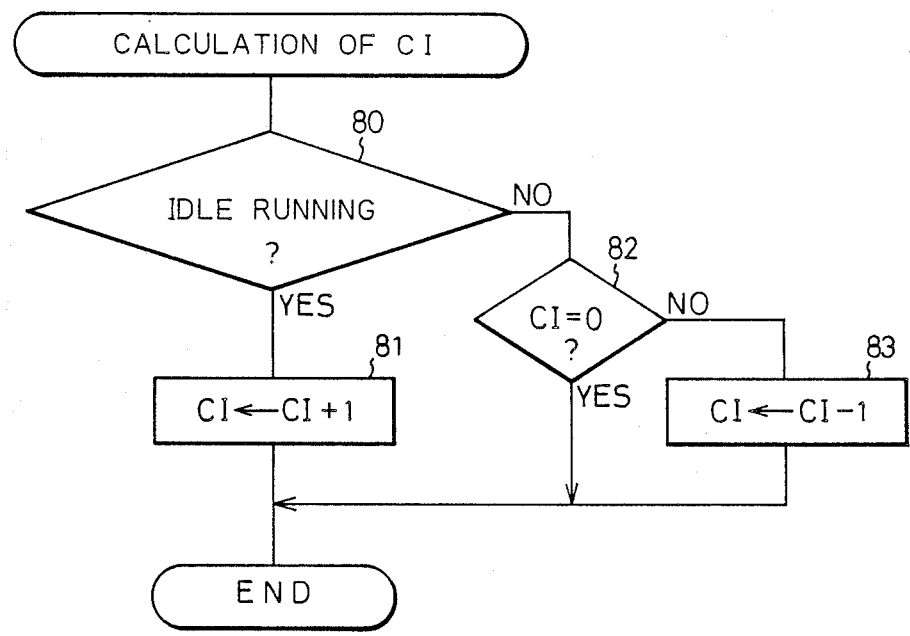
FIG. 3 is a flow chart for executing the calculation of the idle time count value CI.

FIG. 3 illustrates a routine for the calculation of the idle time count value CI. This routine is processed by sequential interruptions executed at 1 sec. intervals.

Referring to FIG. 3, at step 80 it is determined whether or not the engine is in an idle running state. If it is determined that the engine is in an idle running state, the routine goes to step 81 and the idle time count value CI is incremented by 1. If it is determined at step 80 that the engine is not in an idle running state, the routine goes to step 82 and it is determined whether or not the idle time count value CI is equal to 0. If it is determined at step 82 that the idle time count value CI is equal to 0, the idle time count value CI is maintained at 0, but if it is determined at step 82 that the idle time count value CI is not equal to 0, the routine goes to step 83 and the idle time count value CI is decremented by 1. Therefore the idle time count value CI is increased by 1 at 1 sec. intervals while the engine is in an idle running state.

Returning to FIG. 2, in step 53, if CI >40, the routine goes to step 52 and it is determined whether or not a time count value CD is equal to or larger than 25. The time count value CD represents a time elapsed since the diagnosis was started. If the time count value CD is not equal or larger than 25 the routine goes to step 54. In step 54, misfire count values $CF_1 \sim CF_4$, a cylinder number n, the time count value CD, and a flag B are cleared, and the processing cycle is completed. If, at step 53, CI>40, this means that the $O_2$ sensor 14 is not operative, and therefore, a diagnosis of the combustion state can not be made. When, at step 51, the engine operating state satisfies the predetermined condition, and when, at step 53, CI<40, it is determined that the diagnosis conditions are satisfied and the diagnosis can be carried out.

At step 53, if CI<40, the routine goes to step 55 and it is determined whether or not a crank angle count value CK is equal to 3 or 9.

Figure 4:
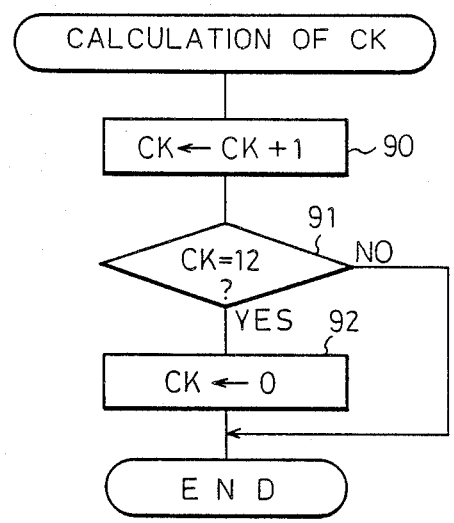
FIG. 4 is a flow chart for executing the calculation of the crank angle count value CK.

FIG. 4 illustrates a routine for the calculation of the crank angle count value CK. This routine is processed by sequential interruptions executed at every crank angle of 30°.

Referring to FIG. 4, at step 90, the crank angle count value CK is incremented by 1, and at step 91 it is determined whether or not the crank angle count value CK is equal to 12. If the crank angle count value CK is equal to 12, the routine goes to step 92, and the crank angle count value CK is cleared. If the crank angle count value CK is not equal to 12, the crank angle count value CK is maintained as it is, and the processing cycle is completed.

Returning to FIG. 2, at step 55, if the crank angle count value CK is not equal to 3 and 9, the routine goes to step 56 and a determination of whether or not a misfire has occurred is not executed. At step 55, if the crank angle count value CK is equal to 3 or 9, the routine goes to step 57 and the cylinder number n is incremented by 1. Note, the cylinder number n represents the cylinder firing order. At step 58, it is determined whether or not the cylinder number n is equal to 5, and if n=5, the routine goes to step 59 and the cylinder number n is made 1. At step 58, if the cylinder number n is not equal to 5, the routine goes to step 60 and a variation $\Delta NE$ in the engine speed is calculated from the following equation.

$$\Delta NE = NEB - NE$$

Where NE is an engine speed in a present combustion process, for example, in No. 1 cylinder (cylinder number n=1), and NEB is an engine speed in a previous combustion process executed immediately before the present combustion process. In this case NEB is an engine speed in a combustion process in No. 4 cylinder (cylinder number n=4), and the combustion process in No. 4 cylinder is executed at a crank angle of 180° before the execution of the combustion process in No. 1 cylinder.

At step 63, it is determined whether or not the variation $\Delta NE$ in engine speed is equal to or larger than a predetermined reference value X. If $\Delta NE \geq X$, i.e., it is determined that a misfire has occurred, the routine goes to step 64 where the misfire count value $CF_n$ of the No. n cylinder is increased by E and the reference value X is added to the engine speed NE. This NE+X is held as NEB and is used in step 60 in the next diagnosis process. At step 63, if $\Delta NE < X$, the routine goes to step 65 and it is determined whether or not the variation $\Delta NE$ in the engine speed is equal to or smaller than a predetermined reference value Y, which is smaller than the reference value X. If $\Delta NE < Y$, i.e., it is determined that a misfire has not occurred, the routine goes to step 66. At step 66, a predetermined value F is subtracted from the misfire count value $CF_n$ of the No. n cylinder and the engine speed NE is memorized as NEB. At step 65, if $\Delta NE > Y$, the routine goes to step 67 and the engine speed NE is memorized as NEB.

Figure 5A:
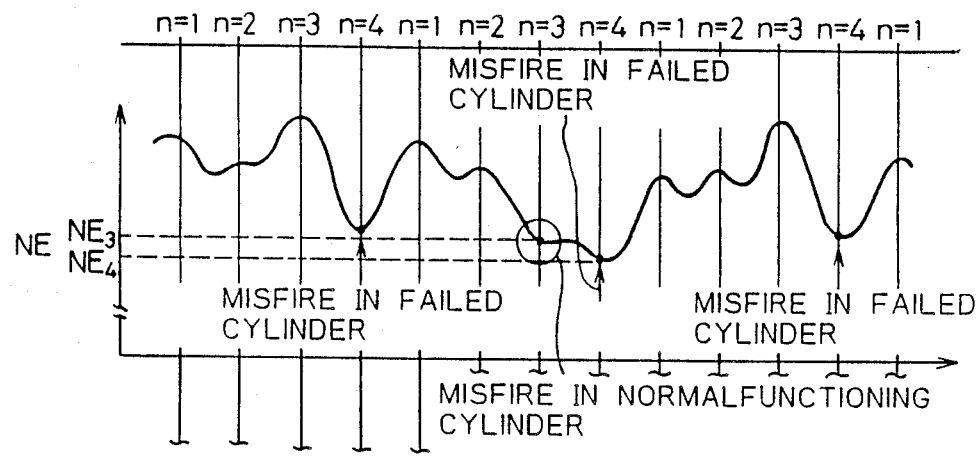
FIG. 5 is a time chart showing changes in the engine speed NE, the variation $\Delta NE$ in engine speed, and the misfire count value $CF_4$.
Figure 5B:
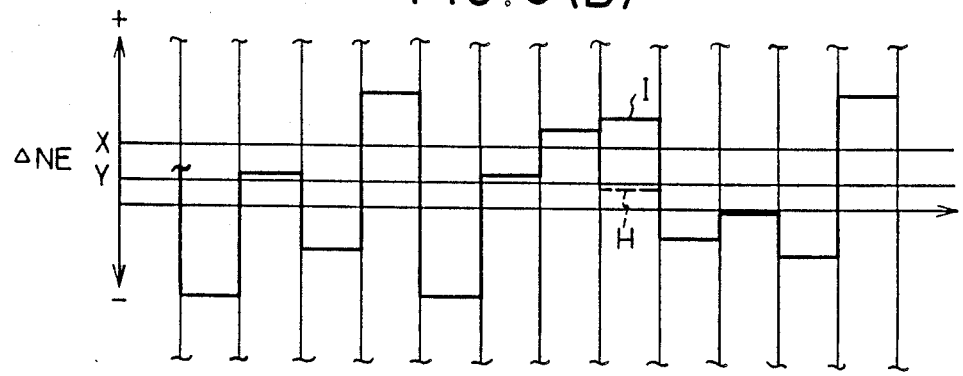
Figure 5C:
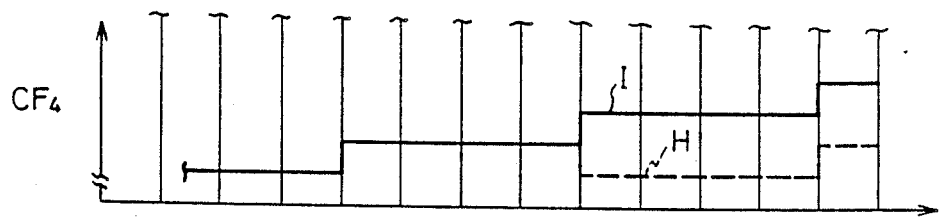

FIG. 5 shows changes in NE, $\Delta NE$, and $CF_4$. Referring to FIG. 5, when the engine is in an idle running state, and when an irregular combustion, i.e., a misfire, has not occurred, the variation $\Delta NE$ in the engine speed is small. If, for example, a failed fuel infector 8 injects a large amount of fuel into the corresponding cylinder, (i.e., failed cylinder) an air-fuel mixture fed into the failed cylinder becomes extremely rich, and thus a misfire occurs in the failed cylinder. In this case, the engine speed NE during the combustion process in the failed cylinder is lowered, and accordingly, the variation $\Delta NE$ in the engine speed becomes larger. Therefore, it can be determined that a misfire has occurred when it is determined that the variation $\Delta NE$ in the engine speed is larger than a predetermined reference value X. In FIG. 5, the failed fuel injector corresponds to No. 4 cylinder, i.e., No. 4 cylinder is the failed cylinder. In this case, the $O_2$ sensor 14 continues to output a rich signal, and accordingly, when an air-fuel ratio feedback control is executed, an air-fuel mixture fed into the normal-functioning cylinders corresponding to the normal-functioning injectors becomes extremely lean and therefore, a misfire occurs in the normal-functioning cylinders. When a misfire occurs in a normal-functioning cylinder, for example, No. 3 cylinder, the engine speed $NE_3$ during the combustion process in No. 3 cylinder is lowered, and thus a difference between the engine speed $NE_3$ and the engine speed $NE_4$ during the combustion process in the failed cylinder, i.e., the variation $\Delta NE$ ($=NE_3-NE_4$) in the engine speed is smaller than the reference value Y. Therefore, in this case, in a prior art device, the misfire in the failed cylinder can not be detected and the predetermined value F is subtracted from the misfire count value $CF_4$ as shown by a broken line H in FIG. 5. In this embodiment of the present invention, when the variation $\Delta NE$ in the engine speed is equal to or larger than the reference value X, and it is determined that a misfire has occurred, the sum of the engine speed NE and the reference value X is memorized as NEB and is used in the next diagnosis process. Accordingly, even if a misfire occurs in a normal-functioning cylinder immediately before the misfire occurs in the failed cylinder, a misfire in the failed cylinder can be easily detected and the predetermined value E added to the misfire count value $CF_4$ of the No. 4 cylinder as shown by a solid line I in FIG. 5.

Returning to FIG. 2, as mentioned before, at step 56 it is determined whether or not the time count value CD is equal to or larger than 25.

Figure 6:
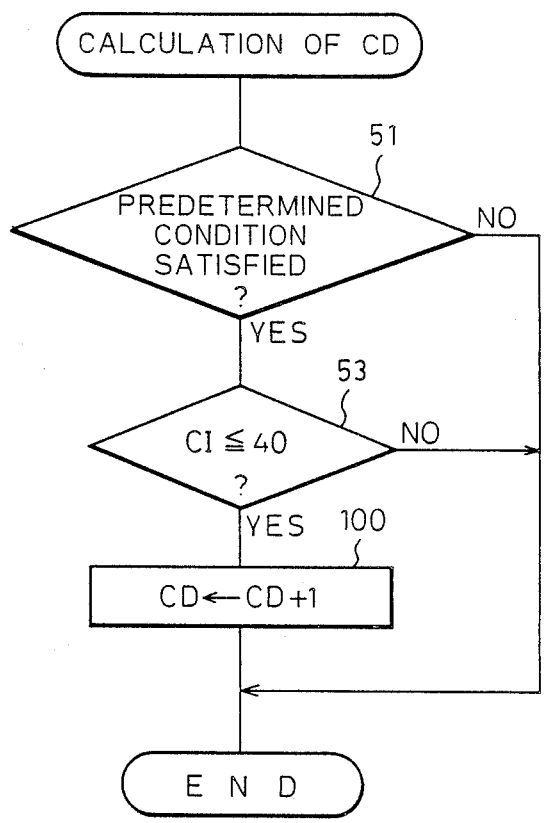
FIG. 6 is a flow chart for executing the calculation of the time count value CD.

FIG. 6 illustrates a routine for the calculation of the time count value CD. This routine is processed by sequential interruptions executed at 1 sec. intervals.

Referring to FIG. 6, at steps 51 and 53, a process similar to the process executed at steps 51 and 53 in FIG. 2 is executed. When it is determined in step 51 that the engine operating state satisfies the predetermined condition and at step 53 that the idle time count value CI is equal to or smaller than 40, the routine goes to step 100, and the time count value CD is incremented by 1. When it is determined at step 51 that the engine operating state satisfies the predetermined condition, or at step 53 that the idle time count value CI is larger than 40, the processing cycle is completed. Note, in this case the time count value CD is cleared at step 54 in the routine illustrated in FIG. 2. Note, the time count value CD represents a time elapsed since the diagnosis was started.

Returning to FIG. 2, at step 56, if CD<25 the processing cycle is completed, but if CD$\geq$25, the routine goes to step 68 and it is determined whether or not the misfire count value $CF_n$ is equal to or larger than a predetermined failure determination value, for example, 100. If at least one of the misfire count values $CF_1$, $CF_2$, $CF_3$ and $CF_4$ is equal to or larger than 100, the routine goes to step 69 and it is determined that a failure has occurred in a cylinder, and at step 70, the flag B is set. At step 68, if $CF_n < 100$, the routine goes to step 71 and it is determined whether or not the misfire count value $CF_n$ is equal to or smaller than a predetermined normal determination value, for example, 60. If $CF_n <= 60$, the processing cycle is completed, but if at least one of the misfire count values $CF_1$, $CF_2$, $CF_3$ and $CF_4$ is larger than 60, the routine goes to step 72 and the flag B is set.

After it is determined at step 56 that the time count value CD is equal to or larger than 25, if it is determined at step 51 that the engine operating state does not satisfy the predetermined condition, or at step 53 that the idle time count value CI is larger than 40, the routine goes to step 52. At step 52, since the time count value CD is equal to or larger than 25, the routine goes to step 73, and it is determined whether or not the flag B is reset. If the flag B is set, the routine goes to step 54, and then the processing cycle is completed, but if the flag B is reset, i.e., at step 71 it is determined that all of $CF_1$, $CF_2$, $CF_3$ and $CF_4$ are equal to or smaller than 60, the routine goes to step 74 and it is determined that the combustion processes in all cylinders are normal.

In this embodiment of the present invention, even if a misfire occurs in a normal-functioning cylinder immediately before a misfire occurs in a failed cylinder, the misfire in the failed cylinder can be easily detected.

In the normal-functioning cylinder in which a misfire has occurred, at the next determination in this normal-functioning cylinder that the variation in the engine speed is equal to or smaller than Y, the predetermined value F is subtracted from the misfire count value $CF_n$. Therefore, since the misfire count value $CF_n$ of this normal-functioning cylinder does not become equal to or larger than 100, it is not determined that a failure has occurred in this cylinder.

Further, in this embodiment of the present invention, the hardware used for a conventional irregular combustion determining device can be utilized with modification.

A second embodiment of the present invention is now described with reference to FIGS. 7 through 10, and is applied to an engine similar to that illustrated in FIG. 1.

Figure 7:
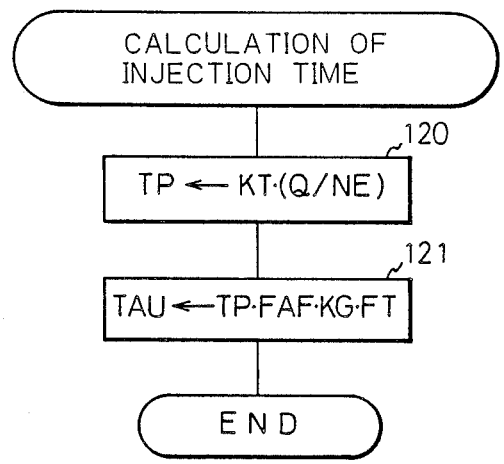
FIG. 7 is a flow chart for executing the calculation of the injection time TAU.

FIG. 7 illustrates a routine for the calculation of the injection time. This routine is processed by sequential interruptions executed at predetermined crank angles.

Referring to FIG. 7, at step 120, the basic injection time TP is calculated from the engine speed NE and the amount of air Q fed into the cylinders, on the basis of signals output by the crank angle sensor 17 and the air flow meter 11. Note, KT indicates a constant value. Then, at step 121, the actual injection time TAU is calculated from the following equation.

$$TAU = TP \cdot FAF \cdot KG \cdot FT$$

Where
TP: a basic injection time
FAF: a feedback correction coefficient
KG: a learning value
FT: An other correction coefficient The feadback correction coefficient FAF is controlled on the basis of the signal output by the $O_2$ sensor 14, so that the air-fuel ratio becomes equal to the stoichiometric air-fuel ratio. When the air-fuel ratio feedback operation is carried out, the FAF normally moves up and down around 1.0, and the learning value KG is determined by learning the preceding movement of the FAF so that the FAF moves up and down around 1.0.

Figure 8:
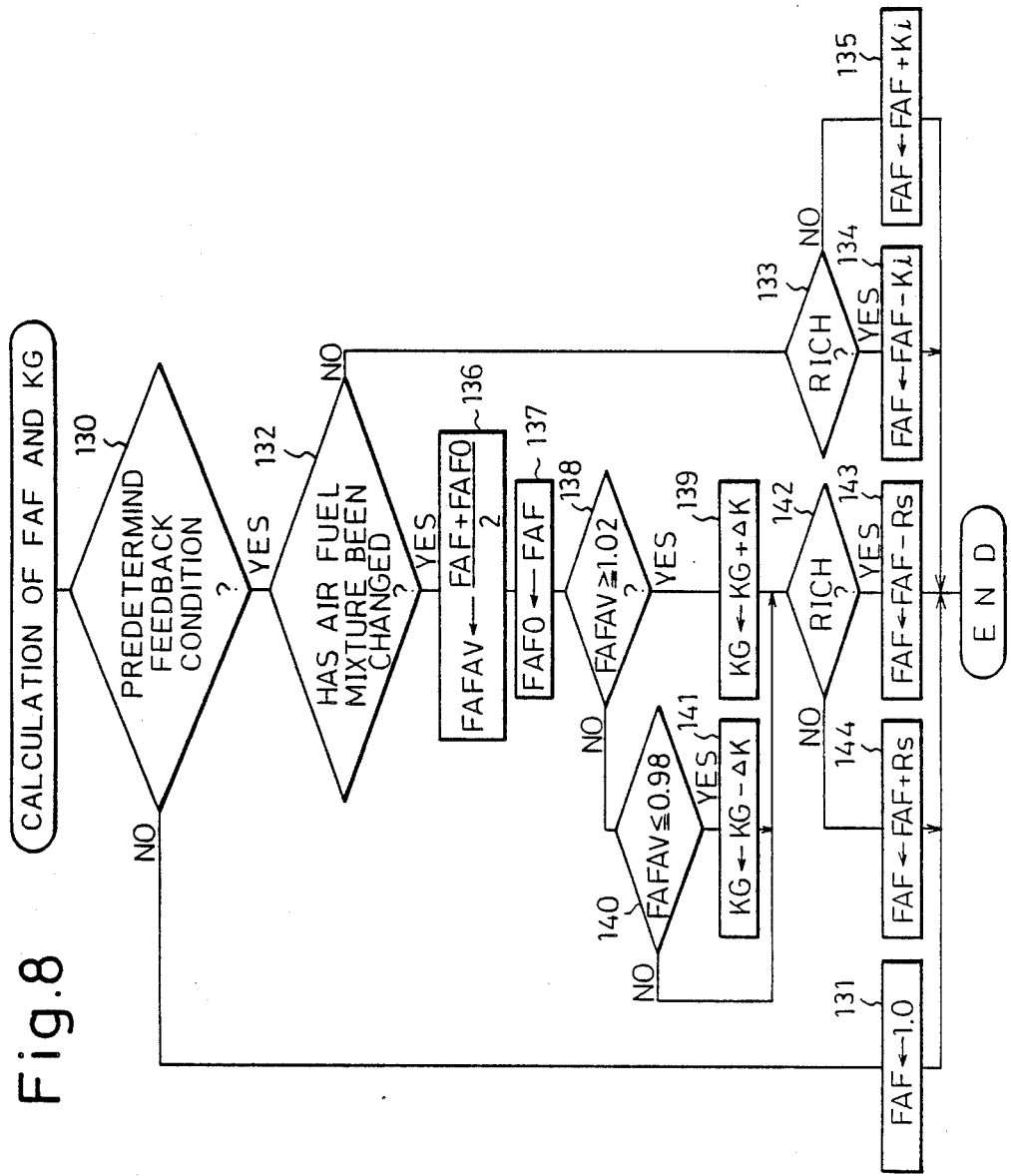
FIG. 8 is a flow chart for executing the calculation of the feedback correction coefficient FAF and the learning value KG.

FIG. 8 illustrates a routine for the calculation of the feedback correction coefficient FAF and the learning value KG. The routine illustrate in FIG. 8 is processed by sequential interruptions executed at predetermined intervals of, for example, every 4 msec.

Referring to FIG. 8, at step 130 it is determined whether the engine operating state satisfies a predetermined feedback condition. It is considered that the engine operating state does not satisfy the feedback condition when, for example, the engine is started; the amount of fuel infected from the fuel infector 8 is larger than a normal amount before or after completion of the warming-up of the engine; the air-fuel ratio is controlled to a lean state; or the $O_2$ sensor 14 is inoperative. When the engine operating state does not satisfy the feedback condition, the routine goes to step 131 and the FAF becomes 1.0. Conversely, when the engine operating state satisfies the feedback condition, the routine goes to step 132 and it is determined whether or not the air-fuel mixture has been changed from lean to rich or from rich to lean after completion of the preceding processing cycle. When the air-fuel mixture has not been changed, the routine goes to step 133 and it is determined whether or not the air-fuel mixture is rich. When the air-fuel mixture is rich, the routine goes to step 134 and an integration value Ki is subtracted from FAF. When the air-fuel mixture is not rich, the routine goes to step 135 and the integration value Ki is added to FAF.

When it is determined at step 132 that the air-fuel mixture has been changed, the routine goes to step 136 and an average FAFAV of the FAF is calculated from the following equation.

$$FAFAV = \frac{FAF + FAFO}{2},$$

Where FAFO is the FAF immediately before the previous change of the air-fuel mixture, then the routine goes to step 137 and the FAF is memorized as the FAFO. Namely, the FAFAV is the mean value of the latest two values of the FAF immediately before a FAF skipping operation is carried out. Then at step 138, it is determined whether or not FAFAV is equal to or larger than 1.02. If FAFAV > 1.02, the routine goes to step 139 and the fixed value ΔK is added to the learning value KG, and the routine then goes to step 142. Conversely, if FAFAV < 1.02, the routine goes to step 140 and it is determined whether or not FAFAV is equal to or smaller than 0.98. If FAFAV > 0.98, the routine goes to step 141 and a fixed value ΔK is subtracted from the learning value KG, and the routine then goes to step 142. If FAFAV > 0.98, the routine goes to step 142 and it is determined whether or not the air-fuel mixture is rich. When the air-fuel mixture is rich, the routine goes to step 143 and a skip value Rs is subtracted from the FAF. Conversely, when the air-fuel mixture is not rich, the routine goes to step 144 and the skip value Rs is added to the FAF.

Figures 9, 9A:
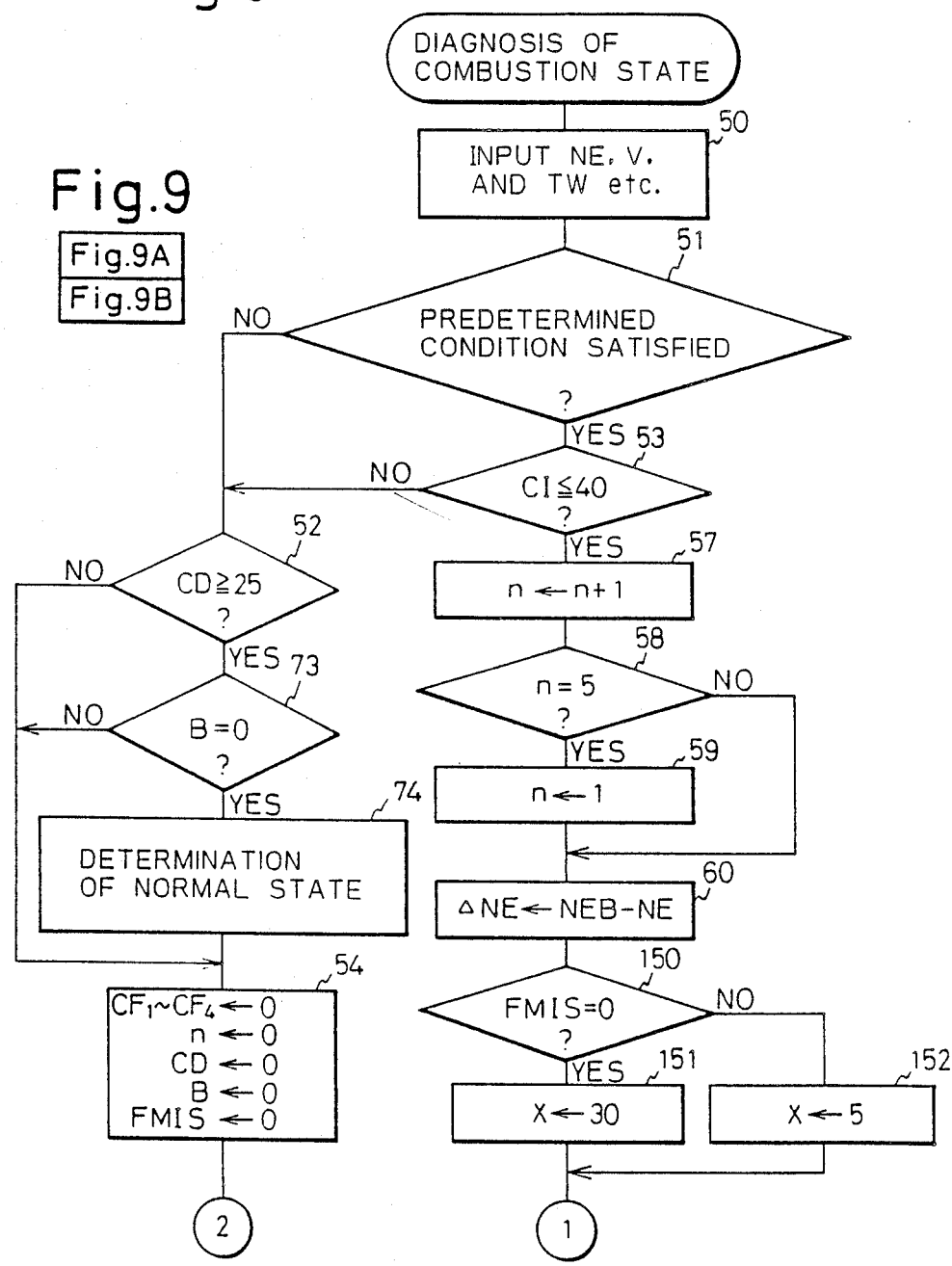
FIGS. 9, 9a and 9b are flow charts of a second embodiment for executing a diagnosis of a combustion state according to the present invention.
Figure 9B:
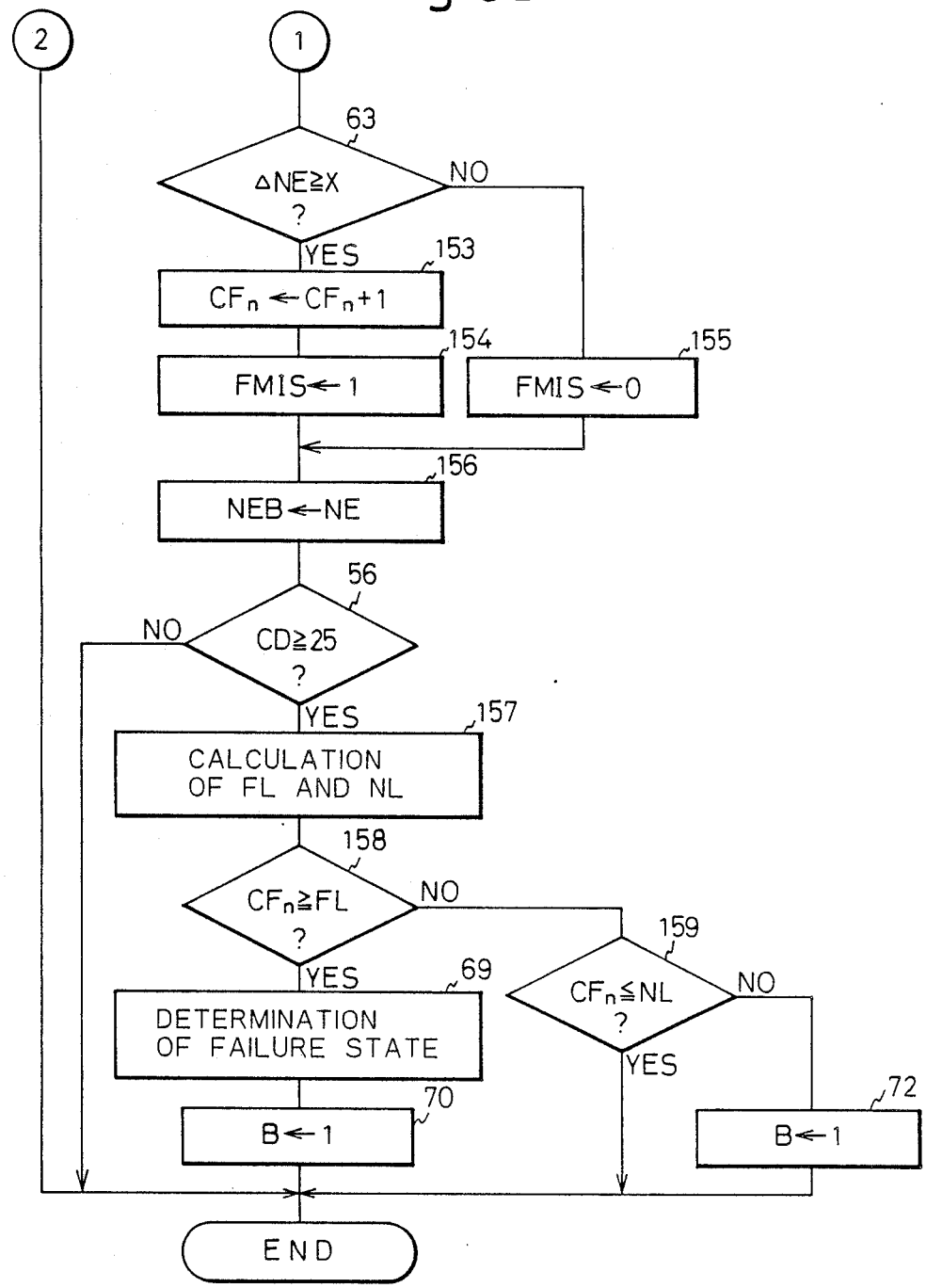

FIG. 9 illustrates a routine for executing the diagnosis of a combustion state in accordance with the second embodiment of the present invention. This routine is processed by sequential interruptions executed at every crankangle of 180°. In FIG. 9, similar steps are indicated by the same step numbers used in FIG. 2, and a description of these similar steps is omitted.

Referring to FIG. 9, at step 150 it is determined whether or not a misfire flag FMIS is reset. When the misfire flag FMIS is set, the routine goes to step 151 and 30 is memorized as the reference value X, and the routine then goes to step 63. When the misfire flag FMIS is reset, the routine goes to step 152 and 5 is memorized as the abnormal reference value X, and the routine then goes to step 63. At step 63, it is determined whether or not the variation ΔNE in the engine speed is equal to or larger than the reference value X. If ΔNE > X, i.e., it is determined that a misfire has occurred, the routine goes to step 153 and the misfire count value $CF_n$ is incremented by 1. Then the routine goes to step 154 and the misfire flag FMIS is set. At step 63, if ΔNE < X the routine goes to step 155 and the misfire flag FMIS is reset. At step 156, the engine speed NE is memorized as NEB and is used in the next diagnosis process. Normally, for example, 30 is used as the reference value X, if at step 63 it is determined that a misfire has occurred, in the next processing cycle a small value, for example, 5, is used as the reference value X. Accordingly even if a misfire occurs in a normal-functioning cylinder immediately before a misfire in the failed cylinder, the misfire in the failed cylinder can be easily determined.

At step 56, if CD (see FIG. 6) >25, the routine goes to step 157 and a failure level FL and a normal level NL are calculated on the basis of FAF·KG.

Figure 10:
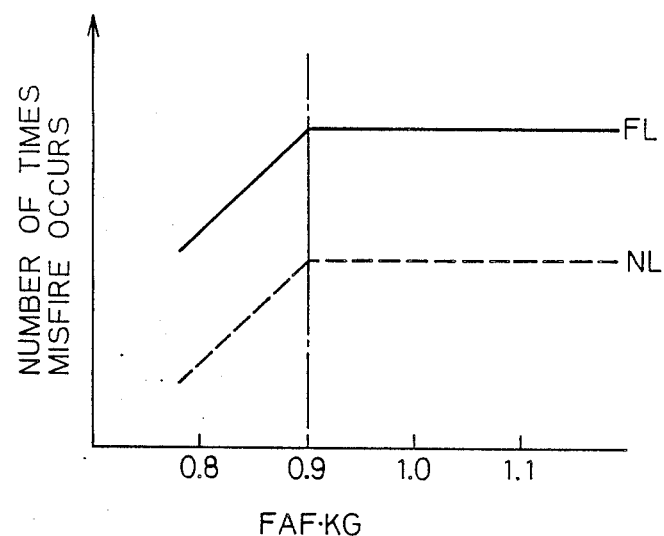
FIG. 10 illustrates the relationships between the failure level FL and FAF·KG, and between the normal level NL and FAF·KG.

FIG. 10 illustrates the relationship between the failure level FL and FAF·KG, and between the normal level NL and FAF·KG.

Referring to FIG. 10, when FAF·KG is larger than 0.9, the failure level FL and normal level NL are constant values, and when FAF·KG is smaller than 0.9, the failure level FL and normal level NL are reduced in accordance with the reduction in the FAF·KG. Note, the failure level FL is always larger than the normal level NL.

Returning to FIG. 9, in step 158, it is determined whether or not the misfire count value $CF_n$ is equal to or larger than the failure level FL. If at least one of the misfire count values $CF_1$, $CF_2$, $CF_3$ and $CF_4$ is equal to or larger than the failure level FL, the routine goes to step 69 and it is determined that a failure has occurred in a cylinder. If $CF_n < FL$, the routine goes to step 159 and it is determined whether the misfire count value $CF_n$ is equal to or smaller than the normal level NL. Then, when all of $CF_1$, $CF_2$, $CF_3$ and $CF_4$ are equal to or smaller than NL, it is determined at step 74 that the combustion state in all cylinders is normal. Note, at step 54, the misfire flag FMIS is also cleared.

When one of the injectors malfunctions and injects a large amount of fuel into a corresponding cylinder then a misfire will occur in that cylinder, and the $O_2$ sensor 14 will continue to output a rich signal. Accordingly the learning value KG is lowered and becomes, for example, 0.8. Therefore the amount of fuel injected by the failed injector is reduced, and thus the richness of the air-fuel mixture fed into the failed cylinder is also reduced. Accordingly, the frequency at which a misfire occurs in the failed cylinder is decreased, and thus it can not be easily determined whether or not a malfunction has occurred in one of the cylinders if the value of the FL, which is the value when KG is large (for example, KG>0.9) is still used as the value of the FL. In this embodiment of the present invention, when an air-fuel ratio fed into the failed cylinder becomes extremely rich and the learning value KG becomes small (for example, KG<0.9) due to the malfunction of the fuel injector, the failure level FL and the normal level NL are lowered in accordance with the FAF·KG. Accordingly, even if the KG is reduced, the failed cylinder can be easily determined.

In FIG. 10, the failure level FL and the normal level NL are raised when the FAF·KG is smaller than 0.9. The reason for this is as follows. Normally, KG is larger than 0.9 and therefore it is assumed that a failure has occurred when KG becomes smaller than 0.9. Accordingly, if the failure level FL is lowered when KG is larger than 0.9, it is possible to erroneously determined that a failure has occurred.

A third embodiment of the present invention is now described with reference to FIGS. 11 through 12, and is applied to an engine similar to that illustrated in FIG. 1. In this embodiment an air-fuel ratio is made equal to the stoichiometric air-feed ratio on the basis of the feedback correction coefficient FAF and the learning value KG, as in the second embodiment.

Figure 11A:
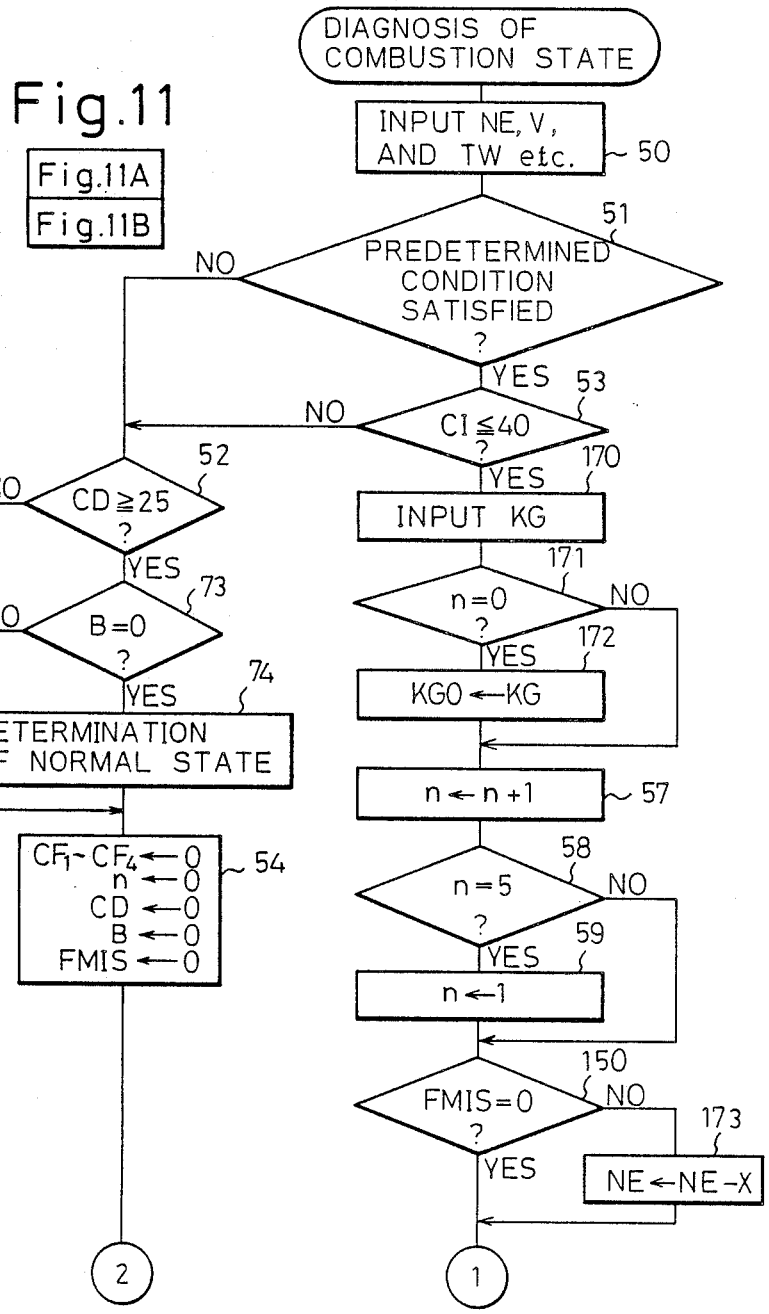
Figure 11B:
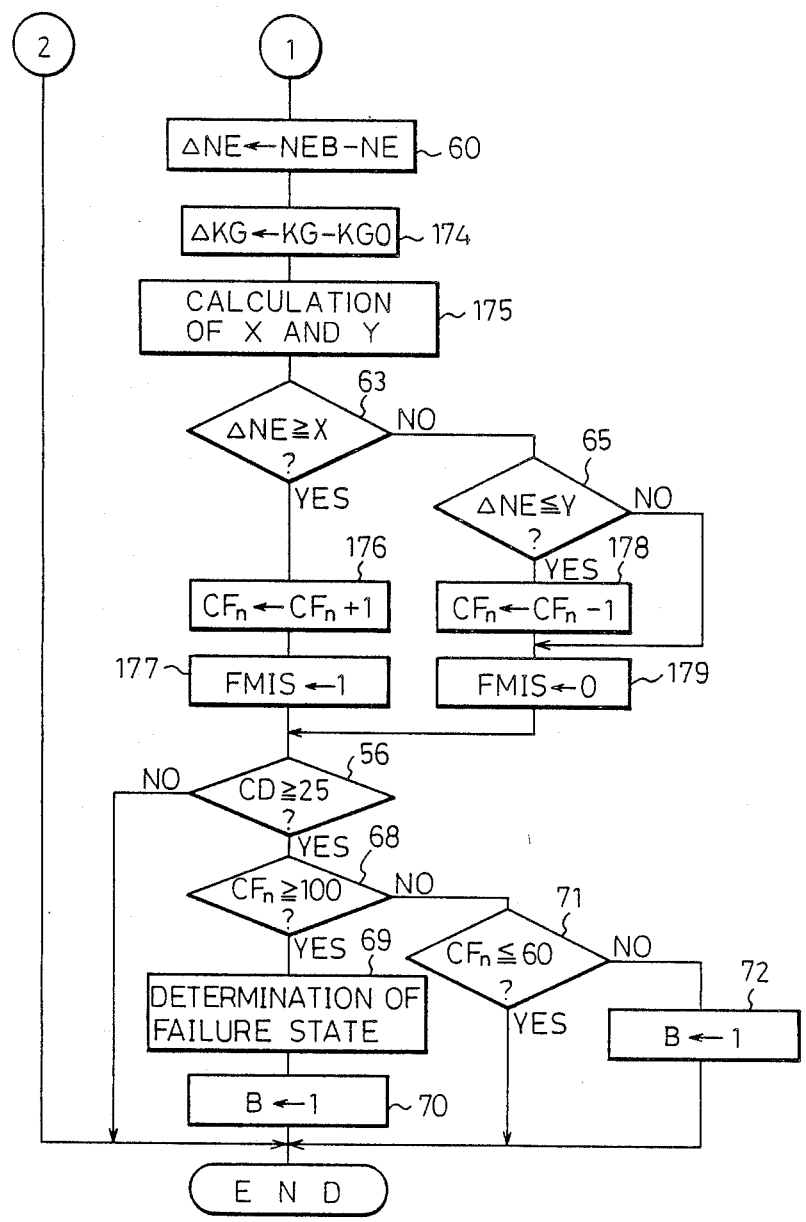

FIG. 11 illustrates a routine for executing the diagnosis of a combustion state in accordance with the third embodiment of the present invention. This routine is processed by sequential interruptions executed at every crank angle of 180°. In FIG. 11, similar steps are indicated by the same step numbers used in FIG. 9, and a description of these similar steps is omitted.

Referring to FIG. 11, at step 170 the learning value KG is input to the CPU 34, and at step 171, it is determined whether or not the cylinder number n is equal to 0. Initially, the cylinder number n is equal to 0, and therefore, the routine goes to step 172 and KG is memorized as the standard leaning value KGO. In the following processing cycle, as the cylinder number n changes from 1 to 4, step 172 is skipped, and accordingly the learning value KG, which is the value at the time when the diagnosis was started, is memorized as KGO. At step 150, it is determined whether or not the misfire flag FMIS is reset, and when the misfire flag FMIS is reset, the routine goes to step 60. Conversely, when the misfire flag FMIS is set the routine goes to step 173, and the reference value X is subtracted from the engine speed NE. At step 60, the variation $\Delta NE$ in the engine speed is calculated, and at 174 the variation $\Delta KG$ of the learning value KG is calculated from the following equation.

$$\Delta KG = KG - KGO$$

Where KGO represents the learning value KG when a failure has not occurred. At step 175, the reference values X and Y are calculated based on the $\Delta KG$.

Figure 12:
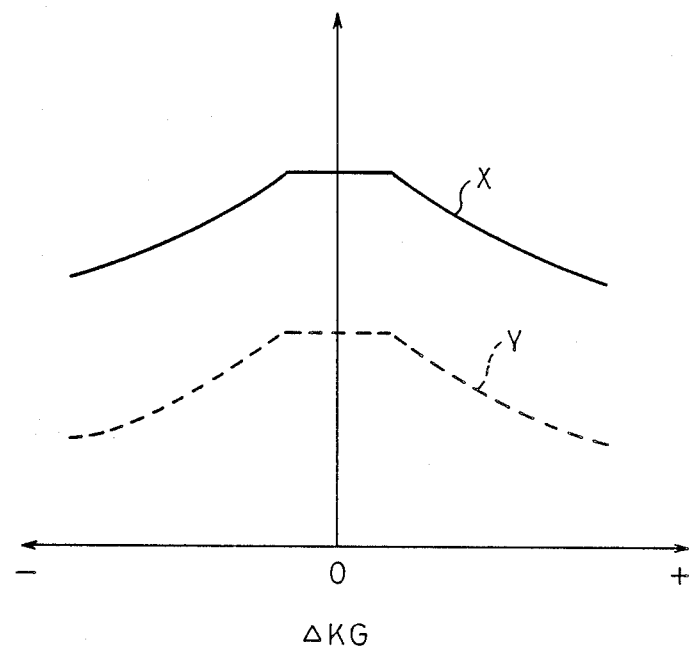
FIG. 12 illustrates the relationship between the reference values X, Y and the variation ΔKG of the learning value; and, FIGS. 13, 13a and 13b are flow charts of a fourth embodiment for executing a diagnosis of a combustion state according to the present invention.

FIG. 12 illustrates a relationship between the reference values X, Y and the $\Delta KG$.

Referring to FIG. 12, the reference values X, Y are at a maximum when the $\Delta KG$ is close to 0, and the reference values X, Y are reduced as the absolute value of the $\Delta KG$ is increased.

Returning to FIG. 11, at step 63, it is determined whether or not the variation $\Delta NE$ in the engine speed is equal to or larger than a predetermined reference value X. When $\Delta NE > X$, i.e., it is determined that a misfire has occurred, the routine goes to step 176. At step 176, the misfire count value $CF_n$ of the No. n cylinder is incremented by 1, and then at step 177, the misfire flag FMIS is set. In the next processing cycle, at step 173, X is subtracted from NE. Namely, when a misfire has occurred, in the next processing cycle the variation $\Delta NE$ in the engine speed is represented by a difference between the preceding engine speed NEB and the difference between the present engine speed NE and the reference value X.

Accordingly, even if a misfire occurs in a normal-functioning cylinder immediately before a misfire occurs in the failed cylinder, the misfire in the failed cylinder can be easily determined.

At step 63, when $\Delta NE < X$, the routine goes to step 65 and it is determined whether or not the variation $\Delta NE$ in the engine speed is equal to or smaller than the predetermined reference value Y. If $\Delta NE < Y$, i.e., it is determined that a misfire has not occurred, the routine goes to step 178 and the misfire count value $CF_n$ of the No. n cylinder is reduced by 1, and at step 179, the misfire flag FMIS is reset. Accordingly, step 173 is skipped in the next processing cycle, and thus the value of the engine speed NE is maintained as it is. At step 65, if $\Delta NE > Y$ the routine goes to step 179. The following steps are similar to the corresponding steps in the first embodiment shown in FIG. 2.

In this third embodiment, since the reference values X and Y are changed in accordance with the $\Delta KG$, which represents the difference between the learning value KGO when a failure has not occurred and the present learning value KG, even if the learning value KG is increased or reduced, the failed cylinder can be easily determined as in the second embodiment.

A fourth embodiment of the present invention is now described with reference to FIG. 13, and is applied to an engine similar to that illustrated in FIG. 1.

Figure 13A:
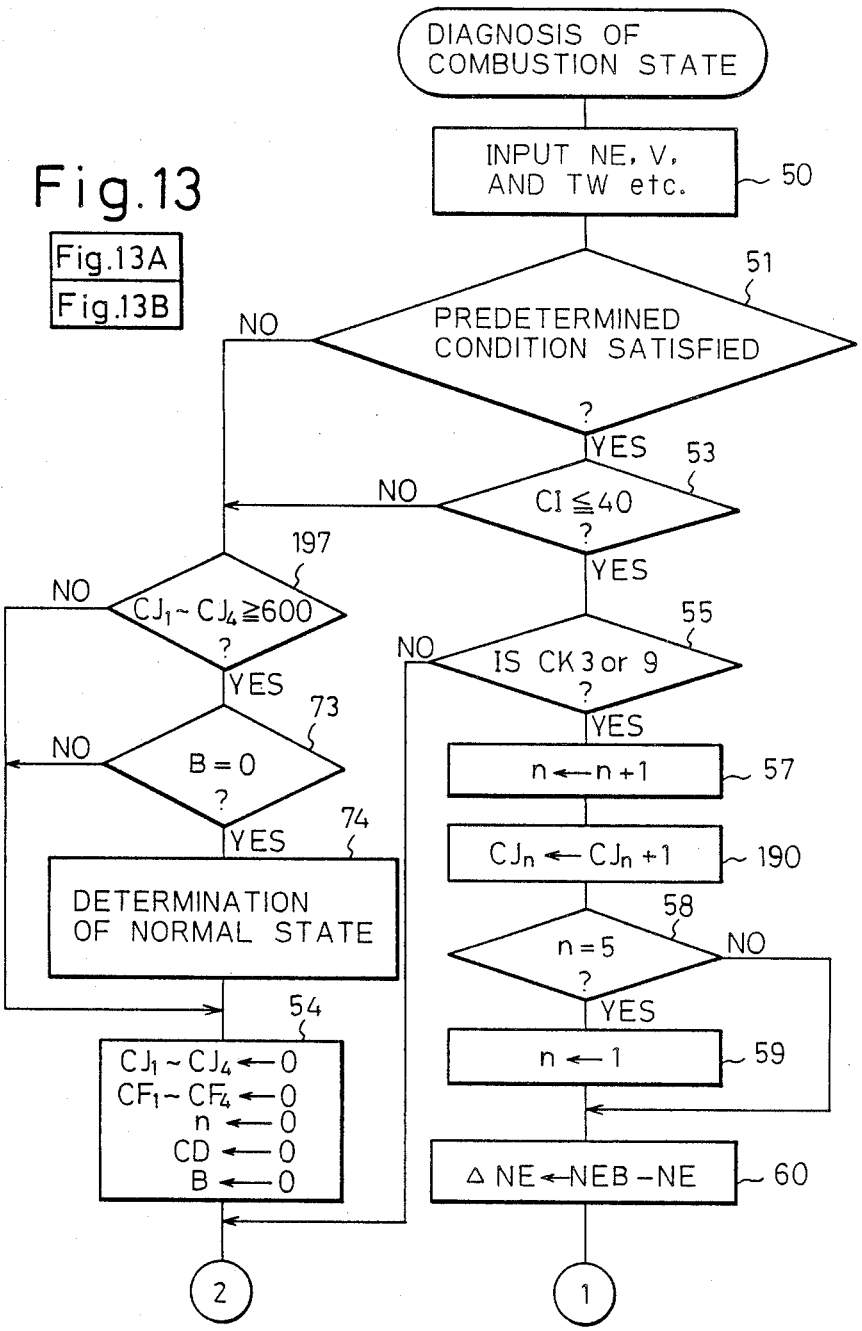
Figure 13B:
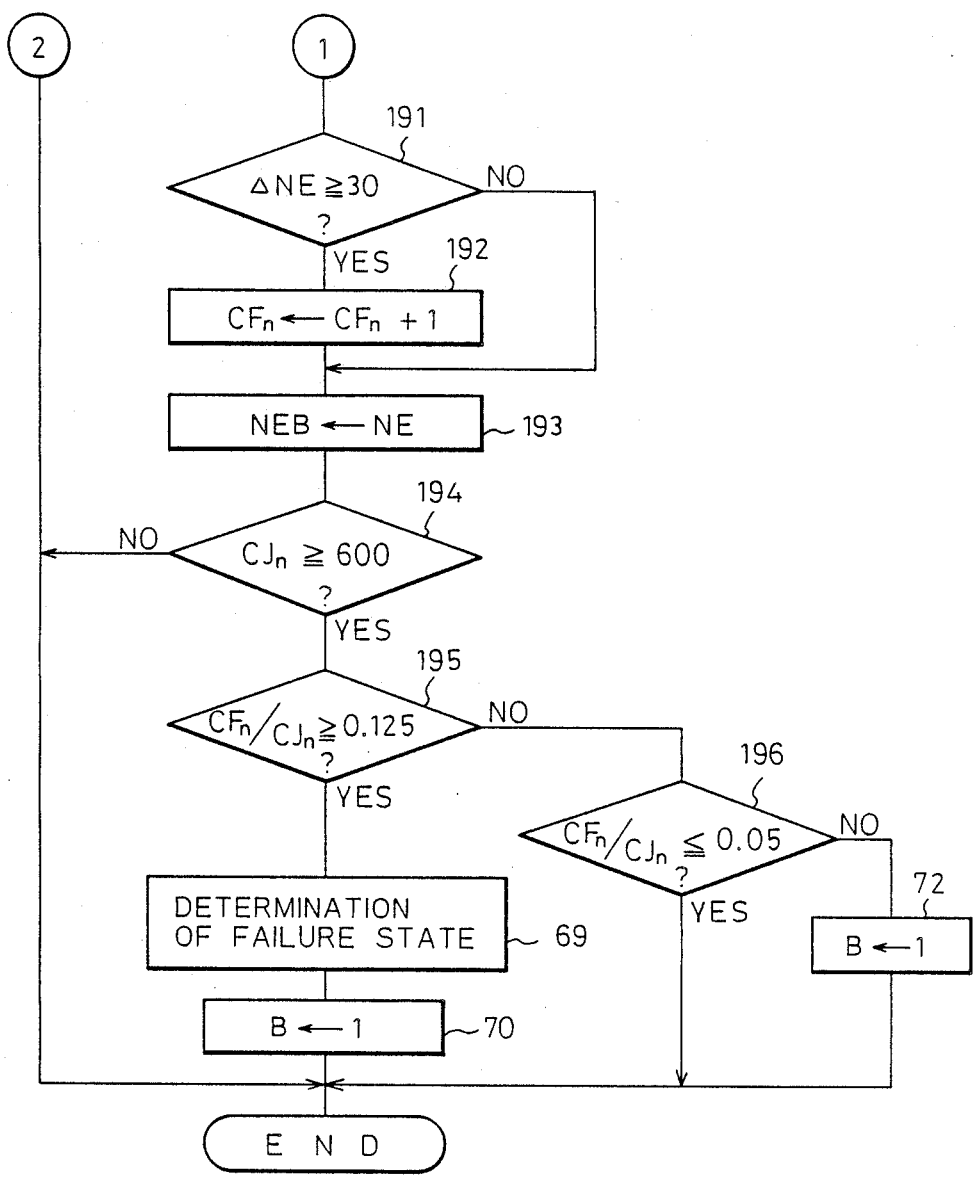

FIG. 13 illustrates a routine for executing the diagnosis of a combustion state in accordance with the fourth embodiment of the present invention. This routine is processed by sequential interruptions executed at every crank angle of 30°. In FIG. 13, similar steps are indicated by the same step numbers used in FIG. 2, and a description of these similar steps is omitted.

Referring to FIG. 13, at step 190, a determining count value $CJ_n$ is incremented by 1, and at step 191, it is determined whether or not the variation $\Delta NE$ of the engine speed is equal to or larger than 30 rpm. If $\Delta NE \geq 30$, i.e., it is determined that a misfire has occurred, the routine goes to step 192 and the misfire count value $CF_n$ is incremented by 1, and at step 193 the engine speed NE is memorized as NEB. At step 191, if $\Delta NE < 30$, the routine goes directly to step 193. Then at step 194, it is determined whether or not the determining count value $CJ_n$ of the No. n cylinder is equal to or larger than 600. If $CJ_n < 600$, the processing cycle is completed, but If $CJ_n> = 600$, the routine goes to step 195 and it is determined whether or not $CF_n/CJ_n$ is equal to or larger than a predetermined value, for example, 0.125. When at least one of $CF_1/CJ_1$, $CF_2/CJ_2$, $CF_3/C_4$ and $CF_4/CJ_4$ is equal to or larger than 0.125, the routine goes to step 69 and it is determined that a failure has occurred. At step 195, when $CF_n/CJ_n<0.125$, the routine goes to step 196 and it is determined whether or not $CF_n/CJ_n$ is equal to or smaller than a predetermined value, for example, 0.05. If $CF_n/CJ_n<0.05$, the processing cycle is completed, but if at least one of $CF_1/CJ_1$, $CF_2/CJ_2$, $CF_3/CJ_4$ and $CF_4/CJ_4$ is larger than 0.05, the routine goes to step 72 and the flag B is set.

After it is determined at step 194 that the determining count value $CJ_n$ is equal to or larger than 600, when it is determined at step 51 that the engine operating state does not satisfy the predetermined condition, or in step 53 that the idle time count value CI is larger than 40, the routine goes to step 197. At step 197, since all of $CJ_1$, $CJ_2$, $CJ_3$ and $CJ_4$ are equal to or larger than 600, the routine goes to step 73. If the flag B is reset, the routine goes to step 74 and it is determined that the combustion state in all cylinders is normal. Note, at step 54, the determining count values $CF_1$, $CF_2$, $CF_3$ and $CF_4$ are also cleared.

This fourth embodiment, obtains an effect similar to that obtained in the first embodiment.

Moreover, a misfire which occurs more than once during 8 revolutions of the engine, i.e., "a one-eighth misfire", can be determined, and thus an overheating of a catalyst arranged in a exhaust passage can be prevented.

Furthermore, in the normal-functioning cylinder in which a misfire has occurred, since it is considered that CF/CJ in the normal-functioning cylinder is smaller than about 4%, it is not determined that a failure has occurred in this normal-functioning cylinder.

Although the invention has been described with reference to specific embodiments chosen for purposes of illustration, it should be apparent that numerous modifications can be made without departing from the basic concept and scope of the invention.

We claim:

1. An irregular combustion determining device for an internal combustion engine, comprising:
   an engine speed detecting means for detecting an engine speed at a predetermined crank angle;
   a variation detecting means for sequentially detecting a variation in an engine speed on the basis of two successive engine speeds detected by said engine speed detecting means;
   first determining means for determining that an irregular combustion has occurred when the variation in the engine speed detected by said variation detecting means is larger than a predetermined first variation in the engine speed; and
   second determining means for determining that, when said first determining means determined that an irregular combustion has occurred, at a next detection of the variation of the engine speed by said variation detecting means, an irregular combustion has occurred when the variation in the engine speed detected by said variation detecting means is larger than a predetermined second variation in the engine speed which is smaller than said predetermined first variation in the engine speed.

2. An irregular combustion determining device according to claim 1, wherein said variation in the engine speed detected by said variation detecting means is represented by a difference between a first engine speed and a second engine speed successively detected by said engine speed detecting means.

3. An irregular combustion determining device according to claim 2, wherein, when a difference between said second engine speed and a sum of said first engine speed and a predetermined first correction speed becomes larger than said first variation of the engine speed, said second determining means determines that the variation in the engine speed detected by said variation detecting means is larger than said second variation in the engine speed.

4. An irregular combustion determining device according to claim 3, wherein said first correction speed is equal to said first variation in the engine speed.

5. An irregular combustion determining device according to claim 2, wherein, when a difference between said first engine speed and the difference between said second engine speed and a predetermined second correction speed becomes larger than said first variation in the engine speed, said second determining means determines that the variation in the engine speed detected by said variation detecting means is larger than said second variation in the engine speed.

6. An irregular combustion determining device according to claim 2, wherein said first variation in the engine speed is equal to 30 rpm.

7. An irregular combustion determining device according to claim 1, further comprising an irregular combustion count means for increasing an irregular combustion count value by a predetermined constant adding value every time it is determined by said first determining means or by said second determining means that an irregular combustion has occurred, and a third determining means for determining that a failure has occurred when said irregular combustion count value becomes larger than a predetermined failure count value.

8. An irregular combustion determining device according to claim 7, wherein said adding value is equal to 1 and said failure count value is equal to 100.

9. An irregular combustion determining device according to claim 7, wherein said irregular combustion count value is reduced by a predetermined constant subtraction value by said irregular combustion count means when the variation in the engine speed detected by said variation detecting means is smaller than a predetermined third variation in the engine speed, which is smaller than said first variation in the engine speed.

10. An irregular combustion determining device according to claim 9, wherein said adding value is equal to said subtraction value.

11. An irregular combustion determining device according to claim 7, further comprising an oxygen concentration detecting means arranged in an exhaust passage of the engine, an air-fuel ratio control means for controlling an air-fuel ratio based on a correction coefficient calculated on the basis of a signal output by said oxygen concentration detecting means so that the air-fuel ratio becomes equal to a predetermined air-fuel ratio, a control coefficient calculating means for calculating a control coefficient based on said correction coefficient to control said first variation in the engine speed in accordance with said control coefficient.

12. An irregular combustion determining device according to claim 11, wherein said correction coefficient comprises a feedback correction coefficient and a learning value.

13. An irregular combustion determining device according to claim 12, wherein said control coefficient is represented by a product of the feedback correction coefficient and the learning value.

14. An irregular combustion determining device according to claim 13, wherein said failure count value is reduced by said control coefficient calculating means when the product of said feedback correction coefficient and said learning value is smaller than a predetermined value.

15. An irregular combustion determining device according to claim 1, further comprising an oxygen concentration detecting means arranged in an exhaust passage of the engine, an air-fuel ratio control means for controlling an air-fuel ratio based on a correction coefficient calculated on the basis of a signal output by said oxygen concentration detecting means so that the air-fuel ratio becomes equal to a predetermined air-fuel ratio, a control coefficient calculating means for calculating a control coefficient based on said correction coefficient, to control said first variation in the engine speed in accordance with said control coefficient.

16. An irregular combustion determining device according to claim 15, wherein said correction coefficient comprises a feedback correction coefficient and a learning value.

17. An irregular combustion determining device according to claim 16, wherein said control coefficient is represented by a variation of said learning value.

18. An irregular combustion determining device according to claim 17, wherein said variation of said learning value is represented by a difference between a first learning value calculated when the determining by said first determining means is started and a second learning value calculated after said first learning value is calculated.

19. An irregular combustion determining device according to claim 17, wherein said first variation in the engine speed is reduced as the absolute value of said variation of said learning value is increased.

* * * * *